Figures 4, 5:
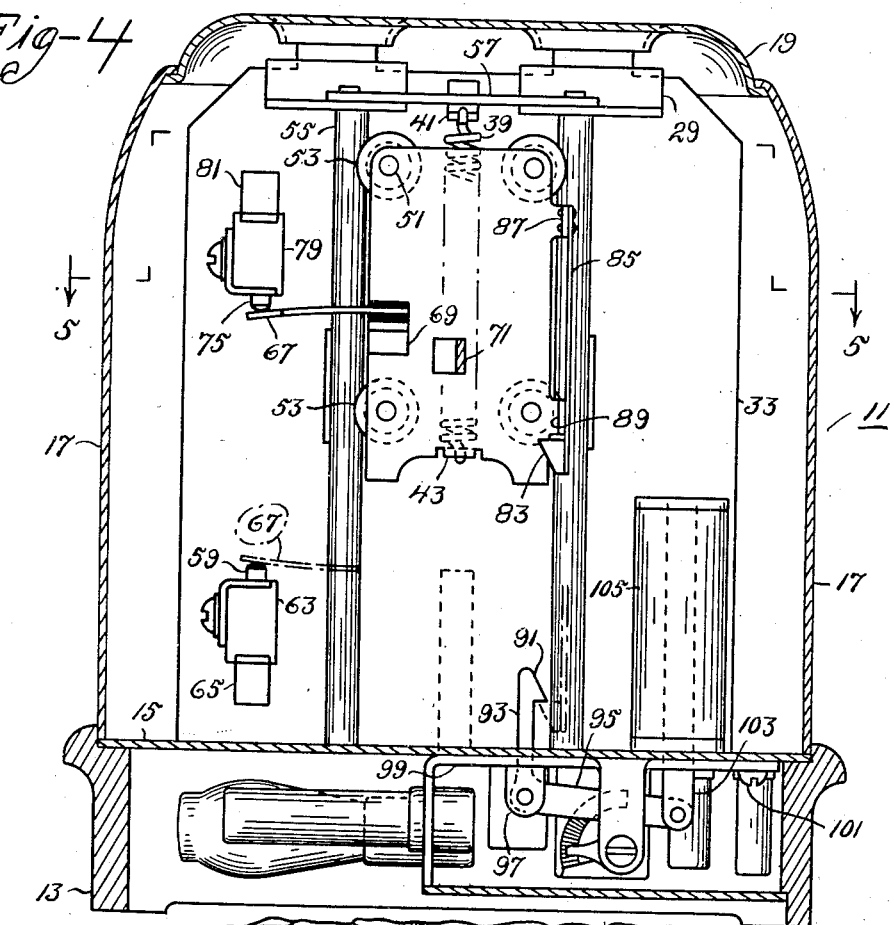

Feb. 18, 1947.  B. G. OLVING  2,415,963
AUTOMATIC ELECTRIC TOASTER
Filed Jan. 31, 1945  3 Sheets-Sheet 1
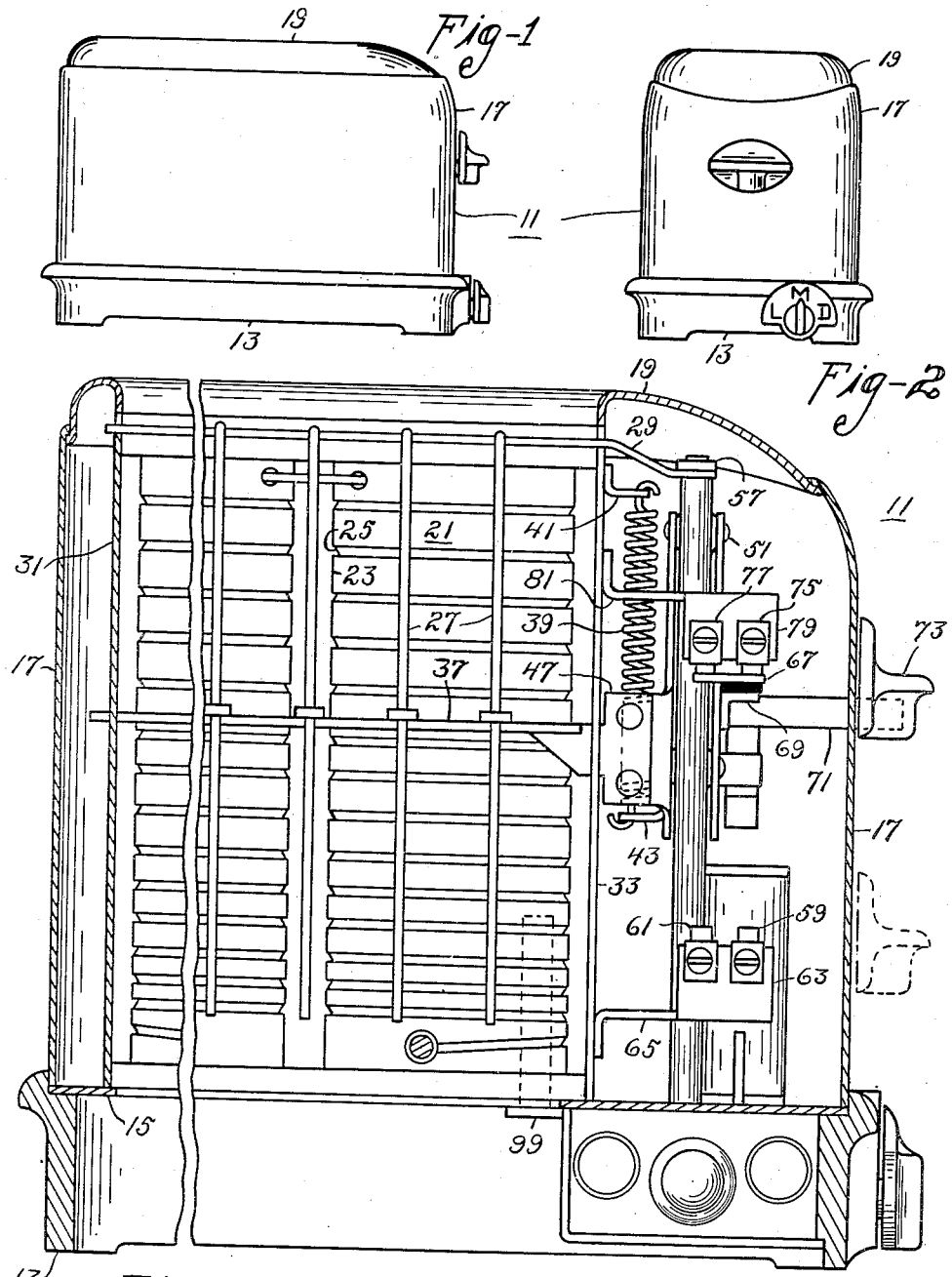
INVENTOR.
BROR G. OLVING
BY Feb. 18, 1947.   B. G. OLVING   2,415,963
AUTOMATIC ELECTRIC TOASTER
Filed Jan. 31, 1945   3 Sheets-Sheet 2

INVENTOR.
BROR G. OLVING
BY
H. M. Biebel
Atty

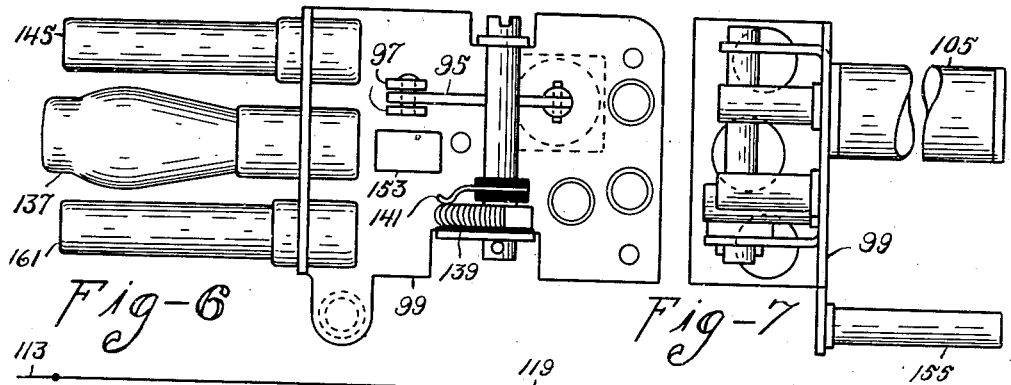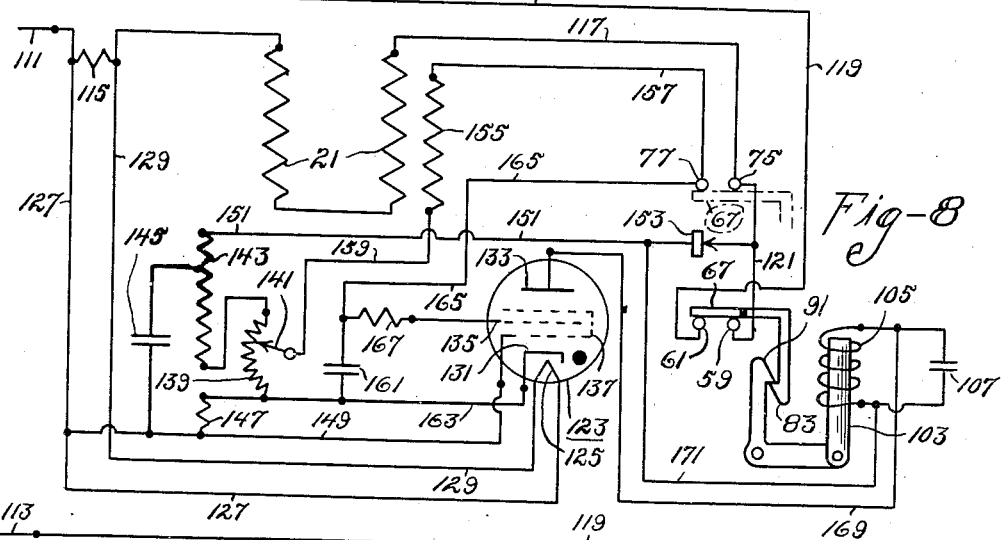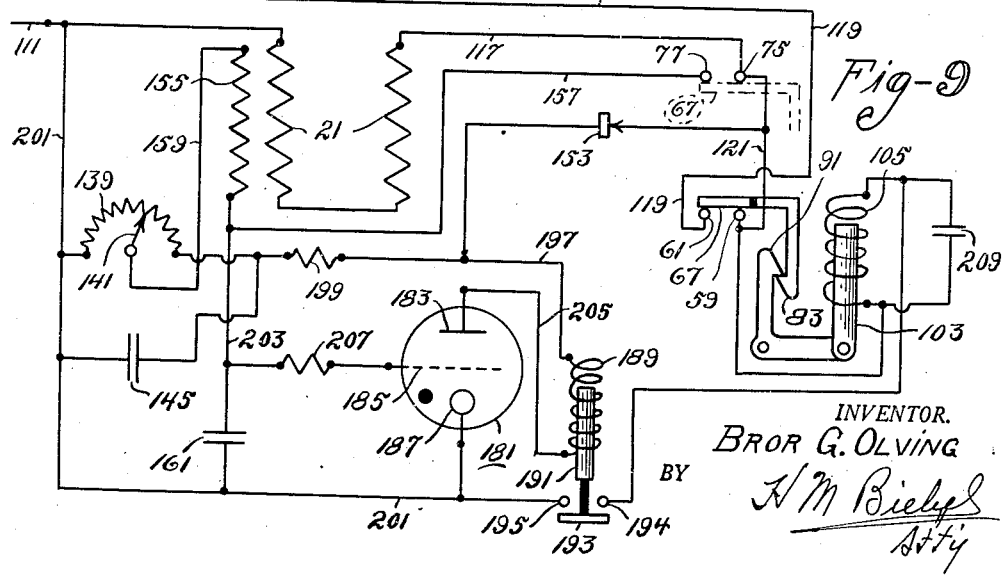

Patented Feb. 18, 1947

2,415,963

UNITED STATES PATENT OFFICE 2,415,963

AUTOMATIC ELECTRIC TOASTER

Bror G. Olving, Elgin, Ill., assignor to McGraw Electric Company, Elgin, Ill., a corporation of Delaware Application January 31, 1945, Serial No. 575,471

6 Claims. (Cl. 219—19)

My invention relates to automatic electric toasters and particularly to timing means for such toasters to predetermine the length of a toasting cycle.

An object of my invention is to provide a timing means and an electric circuit therefor which are dependable and which will stand up in service for a long time.

Another object of my invention is to provide a timing means, the performance of which depends upon the inherent electrical characteristics of its component parts and the operation of which is not dependent upon nor controlled by any energy supplied from mechanical or thermal storage devices.

Another object of my invention is to provide a timing means and an electric circuit therefor, including an electron tube to obtain the above-mentioned performance.

Other objects of my invention will either be apparent from a description of several modifications of circuits embodying my invention or will be pointed out in the course of such description and set forth particularly in the appended claims.

In the drawings,

Figure 1 is a side elevational view of a toaster having operatively associated therewith a system embodying my invention, Fig. 2 is a front elevational view of the toaster, Figs. 1 and 2 being on a reduced scale, Fig. 3 is a longitudinal, vertical, sectional view through a toaster having associated therewith a circuit embodying my invention, Fig. 4 is a vertical, lateral, sectional view therethrough taken on the line 4—4 of Fig. 3, Fig. 5 is a fragmentary horizontal, sectional view taken on the line 5—5 of Fig. 4, Fig. 6 is a bottom view of a timing element comprising a part of my invention, Fig. 7 is an end view of the parts shown in Fig. 6, and, Figs. 8 and 9 are two different diagrams of connections embodying my invention.

Referring first of all to Figs. 1 to 5 inclusive, I have there shown a two-slice domestic toaster 11 which is of the kind now on the market and comprising a base frame 13 which may be made of molded composition material. Base frame 13 has a thin sheet metal base plate 15 mounted thereon at the upper end portion thereof and has also an outer casing 17 which has a cover 19 enclosing the normally open upper end portion thereof.

I provide further a plurality of toast heating elements 21 here shown as four in number; that is, I provide a pair of planar vertical toast heating elements for each of two toasting chambers comprised in a two-slice toaster.

Each toast heating element 21 includes one or more sheets 23 of electric-insulating material, such as mica, on which is wound a strand 25 of a suitable and proper resistor material now well known in the art. I provide further a plurality of vertically extending guard and guide wires 27 on each side of the toasting chambers in order to insure that a slice of bread placed in a toasting chamber will be evenly toasted on both sides by the simultaneous application of radiant and convected heat from the pair of toast heating elements 21. The guard wires 27 may be suspended from top frame plates 29 which extend longitudinally of the toaster. I provide further a rear intermediate wall 31 as well as a front intermediate wall 33. These rear and front intermediate walls cooperate with one of the inner toast heating elements 21 and an outer baffle plate 35 to constitute a toasting chamber.

The method and means for holding all of the hereinbefore enumerated parts in proper operative position relatively to each other are all old and well known in the art.

I provide also a pair of bread carriers 37 which are adapted to be vertically movable in each of the toasting chambers from a top or non-toasting position to a lower or toasting position. The rear end portion of each of the bread carriers extends outwardly through a vertical slot in the rear intermediate wall 31 while the front end portion extends through a vertical slot in the front intermediate wall 33. Since it is desired to normally yieldingly maintain the bread carriers in their upper or non-toasting position, a tension coil spring 39 is provided, the upper end of which engages a lug 41 secured against the front surface of the front intermediate wall 33 while the lower end thereof engages a rearwardly extending lug 43 constituting a part of a rear carriage plate 45. Rear carriage plate 45 is provided with two rearwardly extending extensions 47 to which the front end portions of the bread carriers 37 may be secured in a manner well known in the art. The coil spring 39 is therefore effective to yieldingly hold the bread carriers 37 in their upper non-toasting position.

Means for causing downward movement of the bread carriers comprises a front carriage plate 49 which is spaced from the rear carriage plate 45 by a plurality of headed studs 51 having thereon a plurality of externally grooved rollers 53 positioned between the rear and the front carriage plates. Each of the grooved rollers 53 is rotatably mounted on its stud 51 and may engage the inner surface of vertically extending rods 55, the lower ends of which are secured in the front portion of base plate 15 while the upper ends thereof are held by interengagement with the forward portions of the top frame plates 29. A cross bar 57 is also provided to hold the upper end portions of the rods 55 as well as the front end portions of the top frame plates 29 in properly spaced positions so that the bread carriers can be moved easily and quickly from the upper non-toasting position to their lower toasting position.

Means for controlling the energization of the four toast heating elements 21 comprises a pair of fixed contacts 59 and 61 which are supported as by a block 63 of electric-insulating material which is, by turn, supported by a bracket 65 secured to the front surface of the front intermediate wall 33 adjacent the lower end portion thereof. I provide a contact bridging member 67 which is insulatedly mounted on and supported by a bracket 69 secured to the front carriage plate 49. The front carriage plate 49 has a forwardly extending bar 71 secured thereagainst, the forward end of the said bar extending through a slot in the front wall of the outer casing 17 and has an actuating knob 73 mounted thereon outside of the casing 17.

I provide also a second pair of fixed contacts 75 and 77 which are mounted on a block 79 of electric-insulating material which may be supported by a bracket 81 secured against the front surface of the front intermediate wall 33 adjacent the upper end portion thereof. It is to be understood that contact bridging member 67 is in close engagement with the upper fixed contacts 75 and 77 when the bread carriers are in their raised or upper position and that it is in close operative engagement with contacts 59 and 61 when the bread carriers have been moved downwardly to their lower or toasting position.

Means for holding the bread carriers in their lower or toasting position comprises a hook 83 which is mounted on the lower end of a resilient bar 85, the upper end of which is secured against a projection 87 at the upper right hand side of the front carriage plate 49. Resilient bar 85 is biased in a clockwise direction against a stop 89 which is just above the hook 83. When the bread carriers are moved to their lower or toasting position, hook 83 will engage with the hook-shaped end 91 of a latch comprising in addition to the hook-shaped end 91 of a vertical arm 93, a substantially horizontally extending arm 95 integral with arm 93 and pivotally supported as by a lug or bracket 97 secured against the lower surface of a plate 99 which is, in turn, secured against the lower surface of bottom plate 15 by a plurality of short machine screws 101. An armature core 103 is pivotally mounted on the free end of arm 95 and extends upwardly into a coil 105 constituting a part of the latch release mechanism to be hereinafter described. A small condenser 107 is connected across the terminals of coil 105 to prevent chattering.

It is to be understood that substantially all of the parts hereinbefore described are old and well known in the art and constitute no part of my present invention now to be described.

I provide a pair of supply circuit conductors 111 and 113, conductor 111 being connected to one terminal of a small resistor 115, the use of which will hereinafter appear, the other terminal of resistor 115 being connected to one terminal of one toast heating element 21 which I have shown as being connected in series electric circuit in pairs relatively to each other. The other free terminal of the second toast heating element 21 is connected by a conductor 117 to the upper fixed contact 75. Supply circuit conductor 113 is connected by a conductor 119 to the lower fixed contact 61 while the lower fixed contact 59 is connected by a conductor 121 with the upper fixed contact 75.

I provide an electron tube 123 having therein a heated filament 125, which filament is heated by a resistor 115 through conductors 127 and 129. The tube 123 includes also an indirectly heated cathode 131, a plate anode 133, a grid 135, as well as a shield grid 137.

I provide also an adjustable potentiometer 139 having manually-adjustable contact arm 141, the potentiometer comprising a part of a voltage divider 143 with which the potentiometer is connected in series electric circuit. The ohmic resistance of the potentiometer 139 is on the order of 500 ohms while the total resistance of the voltage divider 143 may be on the order of 3000 ohms. I provide further a ballast condenser 145 which is connected in parallel circuit relative to a part of the voltage divider 143, the potentiometer 139, and another portion 147 of the voltage divider. The lower terminal of the resistor 147, the ohmic resistance of which is on the order of 300 ohms, is connected to a conductor 149 which connects conductor 127 to the screen grid 137. The upper terminal of the voltage divider 143 is connected by a conductor 151 to one terminal of a half-wave dry-type rectifier 153, the other terminal of which is connected to conductor 121. I provide further a timing resistor 155 which has a negative temperature coefficient of resistance and which is so positioned in a toaster as to be subject to radiant heat from one or more of the toast heating elements 21 or is positioned in a toasting chamber itself. One terminal of the timing resistor 155, the ohmic resistance of which is on the order of 10 megohms, is connected by a conductor 157 to the upper fixed contact 77. The other terminal of the timing resistor 155 is connected to the adjustable contact arm 141 by a conductor 159.

I provide further a timing condenser 161, one terminal of which is connected to a conductor 163 which connects the upper end of the small resistor 147 to the lower terminal of potentiometer 139 and to the indirectly heated cathode 131. The function of the small resistor is to give a small negative bias to the cathode 131. The upper fixed contact 77 is connected by a conductor 165 to the other terminal of the timing condenser 161 as well as to the left hand terminal of a current limiting resistor 167 which is connected in series circuit with the grid 135. The resistance of resistor 167 may be on the order of 50,000 ohms. The plate anode 133 is connected to one terminal of the coil 105 of the latch release means by a conductor 169 while a conductor 171 connects the other terminal of coil 105 to conductor 151.

It is to be understood that the resistance of resistor 115 is sufficient to properly energize the heated filament 125 of the electron tube 123.

Let it now be assumed that an operator desires to toast one or two slices of bread which he will drop upon the bread carriers in the toaster when they are in their upper or non-toasting positions. After placing the slices of bread on the bread carriers, he will then press downwardly on knob 73 moving the bread carriers into their lower or toasting positions where they will be held by interengagement of hook 83 with hook 91. The engagement of contact bridging member 67 with the lower fixed contacts 59 and 61 energizes the toast heating elements 21 as well as the resistor 115 and also the rectifier 153. Let it now be assumed that the operator desires to obtain a slice or slices of bread toasted to a medium degree with the contact arm 141 in substantially the position shown in Fig. 8 of the drawings. The energized rectifier 153 will impress half waves of direct current voltage generated by it upon the voltage divider 143, the potentiometer 139, as well as the small resistor 147, the voltage applied to the voltage divider 143 and the potentiometer 139 and the resistor 147 being substantially equal to the peak value of the voltage provided by the alternating current circuit comprising conductors 111 and 113.

The contact arm 141 will provide a predetermined but lower voltage than that provided by the rectifier 153, upon the timing resistor 155 as well as upon the timing condenser 161. The voltage applied to the condenser 161 will be sufficient to charge the same to a voltage high enough to cause firing of tube 123 after a length of time on the order of 2½ or 3 minutes, when the potential applied to the indirectly heated cathode 131 and the grid 135 will be high enough to cause firing of the tube 123; that is, will cause the tube to become conducting. The current traversing the tube 123 is supplied by the conductors 111 and 113, through circuit substantially as follows: from conductor 111, through conductor 127, cathode 131, plate 133, conductor 169, coil 105, conductor 171, rectifier 153, conductor 121, closed main switch and through conductor 119 to the second supply circuit conductor 113, and when this current traverses the tube, it will also traverse the coil 105 of the electromagnetic latch release means with the result of quick upward movement of core 103 and attendant disengagement of hook end 91 from hook 83 and quick upward movement of the bread carriers from their toasting position into their upper or non-toasting position.

As has already been hereinbefore set forth, the characteristic of the timing resistor 155 is that it has a negative temperature coefficient of resistance, that is, the resistance of resistor 155 decreases upon an increase of temperature thereof. This lowered resistance causes a quicker charging of the timing condenser 161 than heretofore with the result that the potential across the terminals of timing condenser 161 will reach a value sufficiently high to cause firing of tube 123 in a shorter time than was the case during the first or cold operation of the toaster and of tube 123. It is only necessary to properly correlate the resistance of timing resistor 155, the negative temperature coefficient of resistance thereof and the characteristic of the electron tube 123 in order to obtain a proper cooperative effect of all of these parts with the result that substantially the same degree of toasting will be obtained in quickly successive toasting operations irrespective of the change of temperature of the toasting structure, and, therefore, of the timing resistor 155.

When it is desired to vary the degree of toasting to be effected, it is only necessary to move contact arm 141 manually before the start of a toasting operation. Thus when arm 141 is moved in a clockwise direction, a lighter piece of toast will be obtained as a higher voltage is impressed on the condenser charging circuit and the timing condenser will be charged to the tube firing potential in a shorter time and conversely if contact arm 141 is moved in a counter-clockwise direction a darker piece of toast will be obtained, as a lower voltage will be impressed from the potentiometer on the condenser charging circuit and a longer time period will be required to charge the condenser to the tube firing potential. It is to be understood that the duration of a toasting operation will vary with a change in the position of the contact arm 141; that is, when arm 141 is moved in a clockwise direction, a shorter toasting period will result while if it is moved in a counter-clockwise direction, a longer period of operation will result.

The use of a timing resistor 155 having a negative temperature coefficient of resistance also effects automatically, a compensation for varying line circuit voltages as the temperature of the toast heating elements 21 will increase when subject to an increased line circuit voltage with the result that the temperature of the timing resistor 155 is also increased with the attendant result that its resistance is still more greatly decreased. The result of this greater decrease in the resistance is that the time period of a toasting operation is also decreased thereby resulting in substantially the same degree of toasting but in a relatively shorter period of time.

The provision of the upper fixed pair of contacts 75 and 77 provides a means for effecting discharge of the condenser 161 through the toast heating elements 21 when the contact bridging member 67 is moved upwardly into engagement therewith, through a circuit comprising resistor 115, the pair of toast heating elements 21, conductor 117, through fixed contact members 75, 77 and contact bridging member 67, through conductor 165, through condenser 161, through a part of conductor 163, through resistor 147, and then through conductor 127 to the other terminal of resistor 115. The condition of condenser 161 is therefore substantially the same after each separate time of operation with the result that the timing cycles provided by the system shown in Fig. 8 will always be initially the same as has hereinbefore been described.

Referring now to Fig. 9 of the drawings, I have there shown a modification of a circuit embodying my invention in which I employ a cold cathode electron tube 181 which has a plate anode 183, a control grid 185, and a cold cathode 187. This tube is inherently of the positive grid-controlled voltage type requiring a positive potential of 85 volts between the control grid and the cathode before firing when a D. C. voltage in the neighborhood of 150 volts is employed between the anode and the cathode.

I provide an electromagnetic latch release comprising an armature coil 105, an armature core 103, as well as an intermediate relay comprising an armature coil 189, an armature core 191 having insulatedly connected therewith a contact bridging member 193 which is adapted to be engaged with and disengaged from a pair of fixed contacts 194 and 195.

I provide also a potentiometer 139 having a manually-adjustable contact arm 141 which is electrically connected by a conductor 159 to one terminal of a timing resistor 155 which has a negative temperature coefficient of resistance and an ohmic resistance, when cold, on the order of 10 megohms. A single half-wave dry-type rectifier 153 is connected between conductor 121 and a conductor 197 which extends from the upper terminal of coil 189 of the intermediate relay to one terminal of a small current limiting resistor 199 having an ohmic resistance on the order of 300 ohms. The other terminal of resistor 199 is connected to one terminal of the potentiometer 139, the other terminal of which is connected to a conductor 201 which extends from supply circuit conductor 111 to fixed contact 195 as well as to the cold cathode 187. A filter or ballast condenser 145 is connected in shunt circuit relatively to the potentiometer 139 while a timing condenser 161 is connected between conductor 201 and a conductor 203, the other terminal of which is connected to the lower terminal of timing resistor 155. The other terminal of the electromagnetic coil 189 is connected by a conductor 205 to plate anode 183. The grid 185 is connected to a current limiting resistor 207, the ohmic value of which is on the order of 10,000 ohms, and has its other terminal connected to conductor 203. A small condenser 209 is connected in shunt circuit with coil 105 to prevent chattering.

Let it now be assumed that an operator desires to toast one or two slices of bread, starting with a cold toasting structure. Contact arm 141 may be set in substantially the position shown in Fig. 9 of the drawings to obtain a medium degree of toasting in a toasting cycle, the length of which is on the order of 2½ to 3 minutes. The voltage impressed upon the timing resistor 155 and through it upon the timing condenser 161 is such that the potential across the terminals of condenser 161 will be raised to a value sufficiently high to cause firing of tube 181 in a length of time on the order of 2½ to 3 minutes. When the tube fires, coil 189 is traversed by a relatively small current causing quick upward movement of armature core 191 and engagement of the contact bridging member 193 with the fixed contacts 195 and 194. This causes a current to traverse coil 105 of the electromagnetic latch release means with consequent quick upward movement of armature core 103 and attendant disengagement of hook end 91 from hook 83 with resultant quick upward movement of the bread carriers into their upper non-toasting positions.

Substantially the same comments as made hereinbefore in connection with potentiometer 139 and the timing resistor 155 shown in Fig. 8 apply equally well to Fig. 9 insofar as obtaining substantially the same degree of toasting with changing temperature of the toaster structure and with obtaining different degrees of toasting as may be desired by an operator.

When contact bridging member 67 is moved into engagement with fixed contacts 75 and 77, the timing condenser 161 is discharged through the two toast heating elements 21 whereby a fully discharged timing condenser results preparatory to any further toasting operation.

Various modifications may be made in the systems embodying my invention without departing from the spirit and scope thereof and all such modifications thereof clearly covered by the appended claims are to be considered as part of my invention.

I claim as my invention:

1. In an automatic electric toaster, the combination with a toasting chamber having electric toast heating means therein adapted to be connected to an A. C. supply circuit and means for starting a toasting operation, of means for terminating a toasting operation comprising a potentiometer, and a rectifier connected in series circuit with each other and across the supply circuit, a timing condenser and a timing resistor energized by said potentiometer to increase the potential of the condenser gradually, an electron tube connected to said condenser and adapted to be fired thereby, means energized by the current traversing the tube when fired for causing termination of a toasting operation, said timing resistor being positioned in the toasting chamber and having a negative temperature coefficient of resistance to cause substantially uniform toasting of successive slices of bread irrespective of temperature change of the toaster and means for causing discharge of said condenser through the toast heating elements after the termination of the toasting operation.

2. In an automatic electric toaster, the combination with a toasting chamber having electric toast heating means therein adapted to be connected to an A. C. supply circuit and means for starting a toasting operation, of means for terminating a toasting operation comprising a potentiometer, and a rectifier connected in series circuit with each other and across the supply circuit, a timing condenser and a timing resistor energized by said potentiometer to increase the potential of the condenser gradually, an electron tube connected to said condenser and adapted to be fired thereby, means energized by the current traversing the tube when fired for causing termination of a toasting operation, said timing resistor being positioned in the toasting chamber and having a negative temperature coefficient of resistance to cause substantially uniform toasting of successive slices of bread irrespective of changes of voltage of the supply circuit, said potentiometer being manually-adjustable to vary the charging voltage applied to the timing condenser circuit to preset the degree of toasting of a slice of bread, and means for causing discharge of said condenser through the toast heating elements after the termination of the toasting operation.

3. In an automatic electric toaster, the combination with a toasting chamber having electric toast heating means therein adapted to be connected to an A. C. supply circuit and means for starting a toasting operation, of means for terminating a toasting operation comprising a potentiometer, and a rectifier connected in series circuit with each other and across the supply circuit, a timing condenser and a timing resistor energized by said potentiometer to increase the potential of the condenser gradually, an electron tube connected to said condenser and adapted to be fired thereby, means energized by the current traversing the tube when fired for causing termination of a toasting operation, said timing resistor being positioned in the toasting chamber and having a negative temperature coefficient of resistance to cause substantially uniform toasting of successive slices of bread irrespective of temperature change of the toaster, said potentiometer being manually-adjustable to vary the voltage applied to the timing condenser circuit to preset the degree of toasting of a slice of bread, and means for causing discharge of said condenser through the toast heating elements after the termination of the toasting operation.

4. In an automatic electric toaster, the combination with a toasting chamber, electric toast heating means therein adapted to be energized from an A. C. circuit, a control switch for the heating means biased to open position and including a contact bridging member, means to move the switch to closed position to start a toasting operation and a releasable latch for holding the switch in closed position, of means for causing release of said latch to terminate a toasting operation comprising a potentiometer and a rectifier connected in series circuit with each other across the supply circuit, a timing condenser and a timing resistor energized by said potentiometer to gradually increase the potential of the condenser, an electron tube connected to said condenser and adapted to be fired thereby, means energized by the current traversing the tube for effecting release of the latch, said timing resistor being positioned in the toasting chamber and having a negative temperature coefficient of resistance to cause substantially uniform toasting of successive slices of bread irrespective of temperature change of the toaster, said potentiometer being manually-adjustable to vary the voltage applied to the timing condenser circuit to preset the degree of toasting of a slice of bread and means including said contact bridging member for causing discharge of said condenser through the toast heating elements after the termination of a toasting operation.

5. In an automatic electric toaster, the combination with a toasting chamber, electric toast heating means therein adapted to be energized from an A. C. circuit, a control switch for the heating means biased to open position and including a contact bridging member, a bread carrier movable into toasting and non-toasting position and biased into non-toasting position, means to move the switch into closed position and said carrier into toasting position and a releasable latch for holding the switch in closed position and the carrier in toasting position, of means for causing release of said latch to terminate a toasting operation comprising a potentiometer and a rectifier connected in series circuit with each other across the supply circuit, a timing condenser and a timing resistor energized by said potentiometer to gradually increase the potential of the condenser, an electron tube connected to said condenser and adapted to be fired thereby, means energized by the current traversing the tube for effecting release of the latch, said timing resistor being positioned in the toasting chamber and having a negative temperature coefficient of resistance to cause substantially uniform toasting of successive slices of bread irrespective of temperature change of the toaster, said potentiometer being manually-adjustable to vary the voltage applied to the timing condenser circuit to preset the degree of toasting of a slice of bread and means including said contact bridging member for causing discharge of said condenser through the toast heating elements after the termination of a toasting operation.

6. In an automatic electric toaster, the combination with a toasting chamber, electric toast heating elements therein adapted to be energized from an A. C. circuit, a control switch for the heating elements biased to open position and including a contact bridging member, a bread carrier movable into toasting and non-toasting positions and biased into non-toasting position, means to move the switch into closed position and said carrier into toasting position, an electromagnetically-releasable latch for holding said switch in closed position and said carrier in toasting position, of means for causing release of said latch to terminate a toasting operation, comprising a potentiometer, a voltage divider and a half-wave dry-type rectifier connected in series circuit across the A. C. circuit, a timing resistor and a timing condenser connected to be energized by said potentiometer to gradually increase the potential of the condenser, a hot cathode normally non-conducting electron tube connected to the condenser and adapted to be fired thereby, said timing resistor being subject to heat from the heating elements, and having a negative temperature coefficient of resistance to cause substantially uniform toasting of successive slices of bread irrespective of changes of temperature of the toaster, said potentiometer being manually-adjustable to preset the duration of a toasting operation and thereby the degree of toasting of a slice of bread, the current traversing said tube being derived from said A. C. circuit and through said rectifier and the coil of said electromagnetic release and means including the contact bridging member for causing discharge of the timing condenser through the toast heating elements and a part of said voltage divider at the termination of a toasting operation.

BROR G. OLVING.

REFERENCES CITED

The following references are of record in the file of this patent:

UNITED STATES PATENTS

| Number | Name | Date |
| --- | --- | --- |
| 2,207,946 | Sardeson | July 16, 1940 |
| 2,061,011 | Vingerhoets | Nov. 17, 1936 |
| 2,317,228 | Shroyer | Apr. 20, 1943 |
| 2,364,998 | Palmer et al. | Dec. 12, 1944 |